US012441400B2

(12) United States Patent
Chang et al.

(10) Patent No.: US 12,441,400 B2
(45) Date of Patent: Oct. 14, 2025

(54) DIFFERENTIAL TRACTION DRIVE AND STEERING AXIS COORDINATION SYSTEM AND METHOD

(71) Applicant: MTD PRODUCTS INC, Valley City, OH (US)

(72) Inventors: Her-Jye Chang, Zionsville, IN (US); Aaron Smith, Zionsville, IN (US); Jay E. Maggard, Polk, OH (US)

(73) Assignee: MTD PRODUCTS INC, Valley City, OH (US)

( * ) Notice: Subject to any disclaimer, the term of this patent is extended or adjusted under 35 U.S.C. 154(b) by 236 days.

(21) Appl. No.: 18/103,114

(22) Filed: Jan. 30, 2023

(65) Prior Publication Data

US 2023/0174154 A1 Jun. 8, 2023

Related U.S. Application Data

(62) Division of application No. 16/699,990, filed on Dec. 2, 2019, now Pat. No. 11,565,750.
(Continued)

(51) Int. Cl.
*B62D 11/10* (2006.01)
*A01D 34/00* (2006.01)
(Continued)

(52) U.S. Cl.
CPC .......... *B62D 11/10* (2013.01); *A01D 34/008* (2013.01); *B60W 10/20* (2013.01); *B62D 1/283* (2013.01);
(Continued)

(58) Field of Classification Search
CPC ........ B62D 11/10; B62D 1/283; B62D 6/002; A01D 34/008; B60W 10/20;
(Continued)

(56) References Cited

U.S. PATENT DOCUMENTS 3,790,871 A * 2/1974 Smith ...................... B60L 3/10
318/52
5,547,038 A 8/1996 Madwed
(Continued)

FOREIGN PATENT DOCUMENTS

| DE | 19949351 A1 | 7/2001 |
| EP | 1327602 A1 | 7/2003 |
| WO | 2007062858 A1 | 6/2007 |

OTHER PUBLICATIONS

International Search Report and Written Opinion of corresponding International Application No. PCT/US2019/063931 dated Jun. 26, 2020, 15 pages.

*Primary Examiner* — Mohamad O El Sayah
(74) *Attorney, Agent, or Firm* — Wegman Hessler Valore (57) ABSTRACT

A system and method for differential traction drive and steering axis coordination for an autonomous mower or other turf device includes initiating a steering motion based on determining a target forward speed and a steering rotational speed, calculating a left wheel speed and a right wheel speed, and applying the left and right wheel speeds, wherein the steering rotational speed is driven by a steering motor and the traction wheels associated with the autonomous mower, and the left and right wheel speeds are based on the target forward speed, a distance from a steering axle to the center of the respective wheel, and the steering rotational speed.

15 Claims, 9 Drawing Sheets

Related U.S. Application Data (60) Provisional application No. 62/774,279, filed on Dec. 2, 2018.

(51) Int. Cl.
  *B60W 10/20* (2006.01)
  *B62D 1/28* (2006.01)
  *B62D 6/00* (2006.01)
  *G05D 1/00* (2024.01)

(52) U.S. Cl.
  CPC .............. *B62D 6/002* (2013.01); *G05D 1/02* (2013.01); *B60W 2300/15* (2013.01)

(58) Field of Classification Search
  CPC ..... B60W 2300/15; G05D 1/02; G05D 1/611; G05D 1/606; G05D 1/6983
  See application file for complete search history.

(56) References Cited

U.S. PATENT DOCUMENTS

| | | |
|---|---|---|
| 5,699,873 A | 12/1997 | Moriya et al. |
| 6,257,357 B1 | 6/2001 | Teal et al. |
| 6,425,450 B1 | 7/2002 | Lansberry |
| 6,456,925 B1 | 9/2002 | Romig |
| 7,778,747 B2 * | 8/2010 | Hawkins ............... B60T 8/1705 701/19 |
| 9,949,607 B2 * | 4/2018 | Merz ...................... B62D 11/10 |
| 10,836,426 B1 | 11/2020 | Busboom et al. |
| 2004/0149506 A1 | 8/2004 | Sakikawa et al. |
| 2004/0167682 A1 | 8/2004 | Beck et al. |
| 2006/0065470 A1 * | 3/2006 | Manken ............... B66F 9/07568 180/410 |
| 2007/0295545 A1 | 12/2007 | Romig et al. |
| 2008/0056687 A1 * | 3/2008 | Moriki ................... B60L 50/11 180/242 |
| 2011/0160963 A1 | 6/2011 | Yasui et al. |
| 2014/0074340 A1 | 3/2014 | Wilson et al. |
| 2014/0090664 A1 | 4/2014 | Walz et al. |
| 2014/0195123 A1 * | 7/2014 | Nishikawa ............... B62D 6/00 701/41 |
| 2015/0289437 A1 | 10/2015 | Behra et al. |
| 2016/0046287 A1 * | 2/2016 | Owen ................... B60W 10/04 701/43 |
| 2016/0302356 A1 | 10/2016 | Haun |
| 2017/0120922 A1 | 5/2017 | Schaedler et al. |
| 2017/0261326 A1 * | 9/2017 | Mizutani ................ G01P 21/02 |
| 2017/0334482 A1 * | 11/2017 | Kojima .................. G01B 21/22 |
| 2018/0086372 A1 * | 3/2018 | Suda ..................... B62D 6/002 |
| 2018/0304917 A1 * | 10/2018 | Michelis ............... B60W 10/16 |
| 2019/0124820 A1 | 5/2019 | Dockter et al. |

\* cited by examiner

DIFFERENTIAL TRACTION DRIVE AND STEERING AXIS COORDINATION SYSTEM AND METHOD

CROSS REFERENCE TO RELATED APPLICATIONS

This application is a divisional of U.S. patent application Ser. No. 16/699,990, filed Dec. 2, 2019, which claims the benefit of U.S. Provisional Application No. 62/774,279, filed Dec. 2, 2018, the entire disclosures of each of which are incorporated herein by reference.

FIELD OF THE INVENTION

The disclosed systems and methods are directed to differential traction drive with steering axis coordination systems and methods, and more particularly, to traction drive with steering coordination systems and methods for autonomous devices. In an aspect, the disclosed systems and methods are suitable for differential traction drive and steering axis coordination for an autonomous mower.

BACKGROUND OF THE INVENTION

Traditional commercial reel mowers, such as triplex and five-plex mowers, include fixed mounting cutting heads in front of the mower. The steering mechanism is controlled by a steered caster type wheel in the back of the mower. This design allows the cutting unit to cut the grass before the traction wheels run over and compact the grass.

Similar designs have been applied to robotic reel mowers, that is, the steering is controlled by a steering motor on top of a steering axle. However, problems occur when the robotic mower encounters and attempts to steer over obstructions such as an irrigation system pod hole, or a sprinkler head. In that scenario, the steering motor outputs a higher than normal torque to achieve the steering motion. The major reason is due to the traction wheel (or drum) which often sinks into the pod or hole, and the steering motor is the major force to steer the wheel out of the pod. At times it is required to lift the robot's weight to escape the pod. This can cause difficulties, for example, a steering fault, or steering stall, due to motor over-current, and the steering motor is stopped, and ceases to steer the wheel.

Traditional reel mowers utilize a steered caster wheel with steering axle control. The caster wheel is for steering purposes only, and does not provide any traction force to move the turf device forward. The traction force, or the force used to generate motion between the turf device and a tangential surface (e.g., the ground), is carried out by front and/or rear traction wheels. Some mowers include two steering wheels, but they are not coordinated to assist the steering while the turf device is mowing.

The limitation of traditional systems, without differential design (i.e. designs using a single motor and a transaxle), is that a device would easily get stuck in these types of scenarios. Previous attempts to solve this problem include an additional mechanism for providing a differential lock. This could be part of the transaxle (adding cost), or it could be external, which adds complexity and creates reliability issues.

Thus, there remains a need for robust, continuous steering operation for devices having traction wheels and steering wheel mechanisms, or similar locomotion designs.

BRIEF SUMMARY OF THE INVENTION

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

In one aspect, a system and method for differential traction drive and steering axis coordination for an autonomous mower includes initiating a steering motion based on determining a target or desired forward speed and a steering rotational speed, calculating a left wheel speed and a right wheel speed, and applying the left and right wheel speeds, wherein the steering rotational speed is driven by a steering motor and the traction wheels (rad./sec.) associated with the autonomous mower, and the left and right wheel speeds are based on the target forward speed, a distance from a steering axle to the center of the respective wheel, and the steering rotational speed.

In further aspects, a target steering position algorithm considers an actual steering position, or defines "steering error" to be the difference between the actual and target steering position.

In an embodiment, a computer implemented method for differential traction drive and steering axis coordination for an autonomous device includes initiating a steering motion based on a target autonomous device speed, and a steering rotational speed, determining a left wheel starting speed based on the target autonomous device speed, a distance from a steering axle associated with the autonomous device to a center of the left traction wheel, and the steering rotational speed, determining a right wheel starting speed based on the target autonomous device speed, a distance from the steering axle to a center of the right traction wheel, and the steering rotational speed, and applying the left wheel starting speed and the right wheel starting speed.

In an embodiment, a computer implemented method for differential traction drive and steering axis coordination for an autonomous includes determining a left wheel ending speed based on the target forward speed, the distance from the steering axle to the center of the left wheel, and a pivot point location, wherein the pivot point location is calculated based at least in part on a distance from a front roller of the autonomous device to the steering axle, determining a right wheel ending speed based on the target forward speed, the distance from the steering axle to the center of the right wheel, and the pivot point location, and subsequent to applying the left wheel starting speed and the right wheel starting speed, applying the left wheel ending speed and the right wheel ending speed.

In an embodiment, a computer implemented method for differential traction drive and steering axis coordination includes a counter-clockwise turn, the value of the left wheel ending speed Vle is substantially equal to Vf*(Dp−Dsl)/Dp, and Vf is the target forward speed, Dp is the distance from the pivot point location to the steering axle, and Dsl is the distance from the steering axle to the center of the left wheel.

In further embodiments, a computer implemented method for differential traction drive and steering axis coordination for an autonomous device of claim 2, wherein for a counter-clockwise turn, the value of right wheel ending speed Vre is substantially equal to Vf*(Dp+Dsr)/Dp, where Vf is the target forward speed, Dp is the distance from the pivot point location to the steering axle, and Dsl is the distance from the steering axle to the center of the right wheel.

In further embodiments, a method for differential traction drive and steering axis coordination for an autonomous device includes a pivot point location Dp substantially equal to $Dw/\sin(\alpha)$, where Dw is the distance between the front roller and the steering axle, and $\alpha$ is the steering angle.

In yet further embodiments, a computer implemented method for differential traction drive and steering axis coordination for an autonomous device includes for a clockwise turn, the value of right wheel ending speed Vre is substantially equal to $Vf*(Dp-Dsr)/Dp$, where Vf is the target forward speed, Dp is the distance from the pivot point location to the steering axle, and Dsr is the distance from the steering axle to the center of the right wheel, and the value of left wheel ending speed Vle is substantially equal to $Vf*(Dp+Dsl)/Dp$, where Vf is the target forward speed, Dp is the distance from the pivot point location to the steering axle, and Dsl is the distance from the steering axle to the center of the left wheel.

In an embodiment, a computer implemented method for differential traction drive and steering axis coordination for an autonomous device includes determining a left wheel transitional speed based on the determined left wheel starting speed, the determined left wheel ending speed, and a difference between a current steering angle associated with the autonomous device and a target steering angle; and subsequent to applying the left wheel starting speed and the right wheel starting speed, and prior to applying the left wheel ending speed and the right wheel ending speed, applying the left wheel transitional speed and the right wheel transitional speed.

In further embodiments, a computer implemented method for differential traction drive and steering axis coordination for an autonomous device includes applying the left wheel transition speed and right wheel transition speed when the difference between the current steering angle and the target steering angle is less than a predetermined threshold angle.

In an embodiment, a computer implemented method for differential traction drive and steering axis coordination for an autonomous device includes the steering rotational speed driven by a steering motor.

In further embodiments, a computer implemented method for traction control for a turf device having at least one wheel for providing motion on a ground surface includes detecting a wheel slip event, and responsive to the wheel slip event, stopping motion of the wheel and then gradually increasing a wheel speed, detecting a further wheel slip event, stopping motion of the wheel, determining that a steering angle of the wheel is less than or equal to a predetermined maximum steering angle and adjusting the steering angle of the wheel, gradually increasing the wheel speed while the steering angle is less than or equal to a predetermined maximum steering angle.

In an embodiment, a computer implemented method for traction control of claim 10, wherein adjusting a steering angle of the wheel comprises adjusting the steering angle to a first defined value.

In an embodiment, a computer implemented method for traction control includes subsequent to adjusting the steering angle to a first defined value, adjusting the steering angle to a second defined value opposite to the first defined value, gradually increasing the wheel speed.

In an embodiment, a computer implemented method for traction control includes increasing a first defined angle in successive iterations, wherein the second defined angle is opposite to the first defined angle.

In an embodiment, a computer implemented method for traction control includes stopping operation of the turf device when the steering angle exceeds a predetermined maximum steering angle.

In an embodiment, a computer implemented method for traction control includes determining the steering angle based on data associated with the weight distribution of the turf device.

In an embodiment, a computer implemented method for traction control for a turf device having a motor for driving two or more traction wheels providing motion over a ground surface includes measuring a motor current, calculating an expected motor current, detecting a wheel slip condition based on a comparison of the measured motor current to the calculated motor current.

In an embodiment, a computer implemented method for traction control for a turf device includes calculating at least one of an expected linear velocity, linear acceleration, rotational velocity, and/or rotational acceleration associated with the turf device, calculating an expected linear velocity, linear acceleration, rotational velocity, and/or rotational acceleration associated with the turf device, measuring linear velocity, linear acceleration, rotational velocity, and/or rotational acceleration associated with the turf device, and detecting a wheel slip condition based on a comparison of the measured linear velocity, linear acceleration, rotational velocity, and/or rotational acceleration to the calculated linear velocity, linear acceleration, rotational velocity, and/or rotational acceleration.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

It should be noted that all the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

The following terms are used throughout the description, the definitions of which are provided herein to assist in understanding various aspects of the subject disclosure.

As used herein, the terms "autonomous mower", "device", "turf device", "robotic mower", "vehicle" and "robot" refer to an autonomous robot, or most any autonomous device, vehicle or machine that performs various tasks and functions including lawn mowing, lawn maintenance, vacuum cleaning, floor sweeping and the like. Similarly, and as used herein, the terms "autonomous mower", "robotic mower", "vehicle", "turf device", "device" and "robot" are used interchangeably and refer to most any device, or machine that utilizes both traction and steering mechanisms, wherein the device or machine is not necessarily autonomous.

The term "traction drum" can include multiple traction wheels, e.g., front, rear, left and/or right traction wheels. The individual traction wheels may be independently controlled by the turf device.

In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

The disclosed technology can include multiple traction motors, for example, a separate traction motor can be associate with each traction wheel. During a steering operation, for example, when the turf device turns left, the steering turns in a clockwise motion. Because the turf device includes two independent traction motors, the turf device can coordinately command both wheel speeds so that the left wheel rotates forward, and right wheel rotates backwards to assist the steering motor. This coordination allows the required torque from the steering motor to be greatly reduced. The disclosed technology provides robust, continuous steering operation when compared to turf devices or vehicles having similar locomotion designs.

Advantages of the differential traction drive with steering axis coordination include less stress on the steering motor, faster response for the turn motion, provides a flexible, dynamic implementation of a "differential lock" type feature via software, without additional mechanical components; and better traction control when stuck due to an obstacle such as an irrigation pod, or a sprinkler head.

In other embodiments, where no steering motor is included, the wheel traction motor(s) can be utilized to control the steering and traction at the same time.

Figure 1:
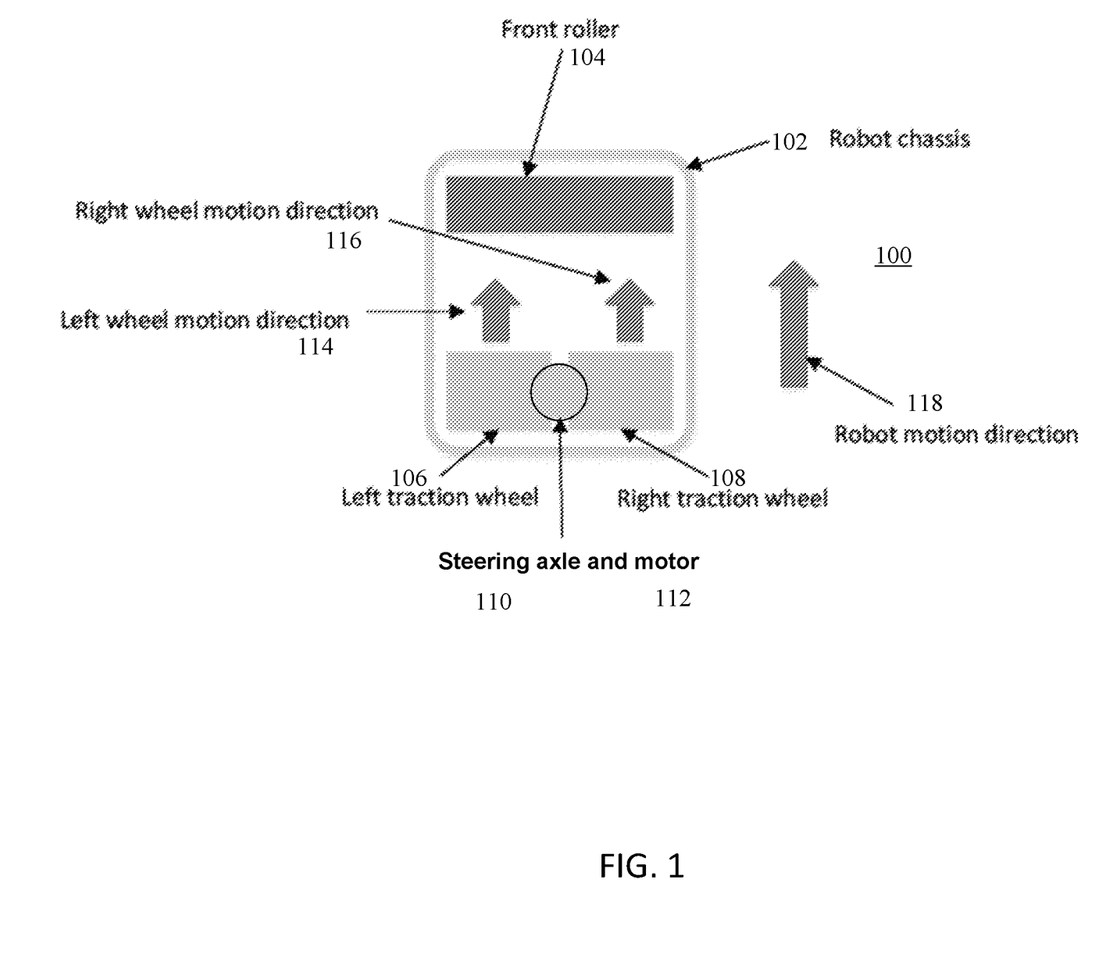
FIG. 1 is an illustration of an example system for differential traction drive with steering axis coordination in accordance with an aspect of the disclosure.

Referring to FIG. 1, a top view block diagram of a turf device 100 is shown, including a turf device chassis 102, front roller 104, a traction drum including a left traction wheel 106 and a right traction wheel 108, a steering axle 110, a steering motor 112, an indication of the left wheel motion direction 114, an indication of the right wheel motion 116, and an indication of the direction of movement 118 of the turf device 100.

A drive section (not shown) is connected to steering axle 110 and a steering motor 112 to pivot and direct motion of the left traction wheel 106 and right traction wheel 108 during operation, thus allowing the turf device 100 to alter its path during movement.

Figure 2:
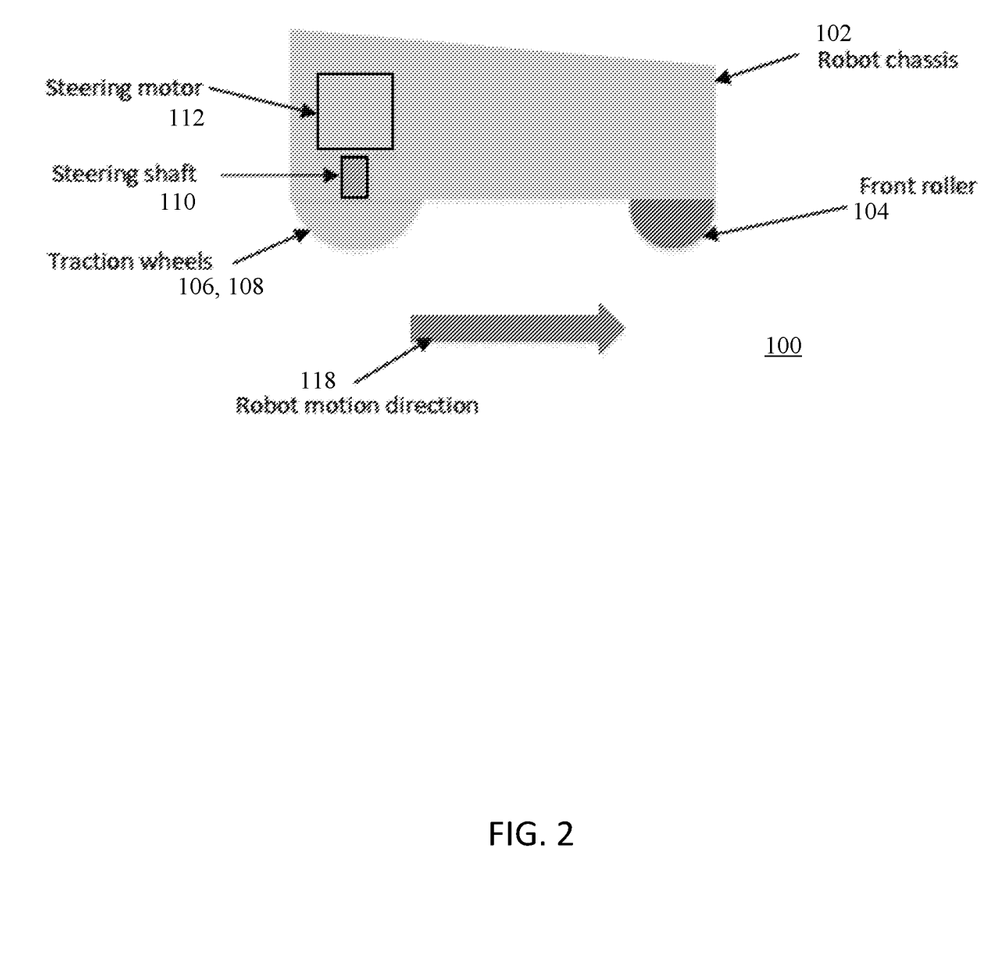
FIG. 2 is an illustration of an example system for differential traction drive with steering axis coordination in accordance with an aspect of the disclosure.

Referring to FIG. 2, a side view of the turf device 100 is shown, including the robot chassis 102, front roller 104, traction wheels 106, 108, steering shaft 110, steering motor 112, and robot motion direction 118.

Figure 3:
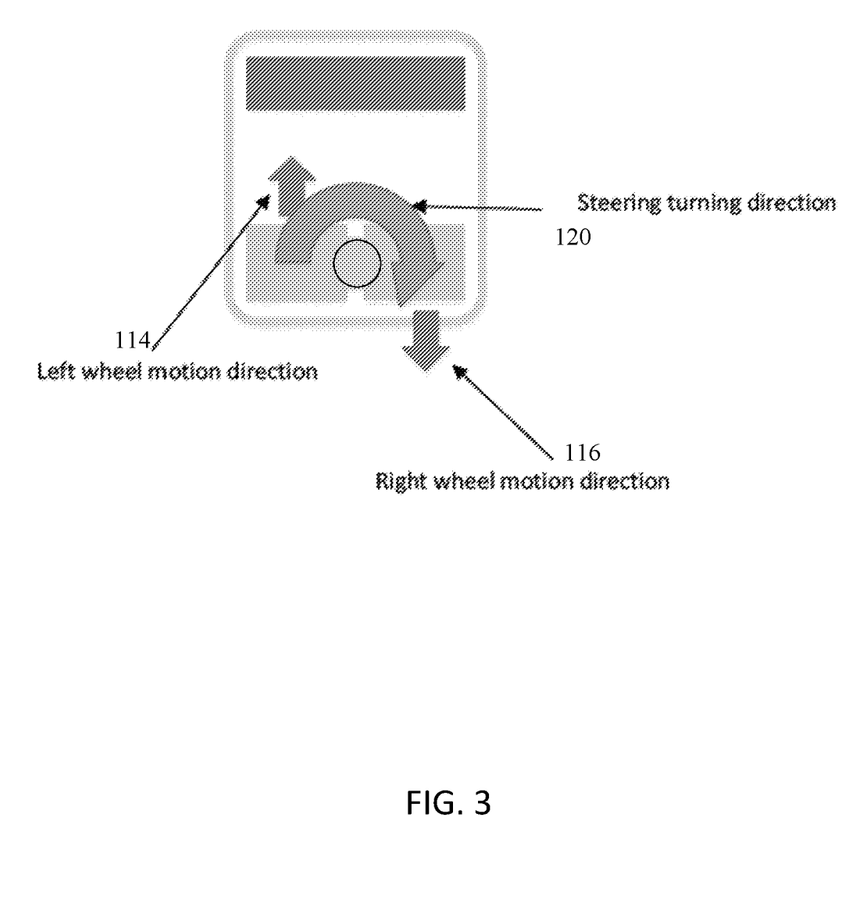
FIG. 3 is an illustration of an example system for differential traction drive with steering axis coordination in accordance with an aspect of the disclosure.

Referring to FIG. 3, during a steering operation, for example, the turf device 100 turns left, the steering mechanism turns in a clockwise motion. When the turf device 100 is making a left turn, and the back wheel assemblies 106, 108 steer in clockwise direction first. The left and right wheels 106, 108 are commanded in the directions to assist the steering.

Figure 4:
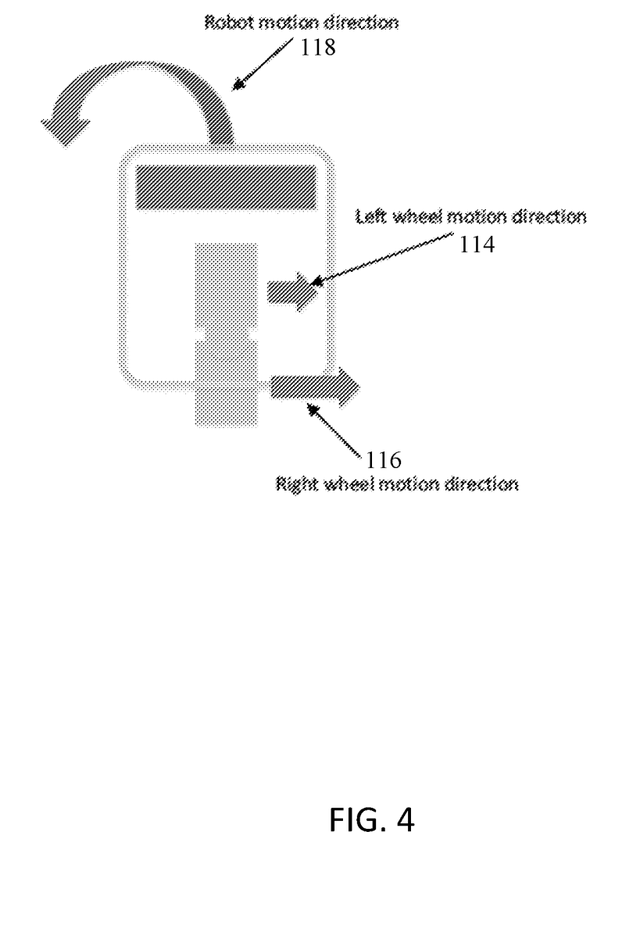
FIG. 4 is an illustration of an example system for differential traction drive with steering axis coordination in accordance with an aspect of the disclosure.

As shown in FIG. 4, once a desired steering angle is achieved, the left and right wheels 106, 108 are caused to move in a forward direction causing the turf device 100 to turn left. The ratio of left wheel speed 122 and the right wheel speed 124 can be calculated based on the desired turning radius.

Figure 5:
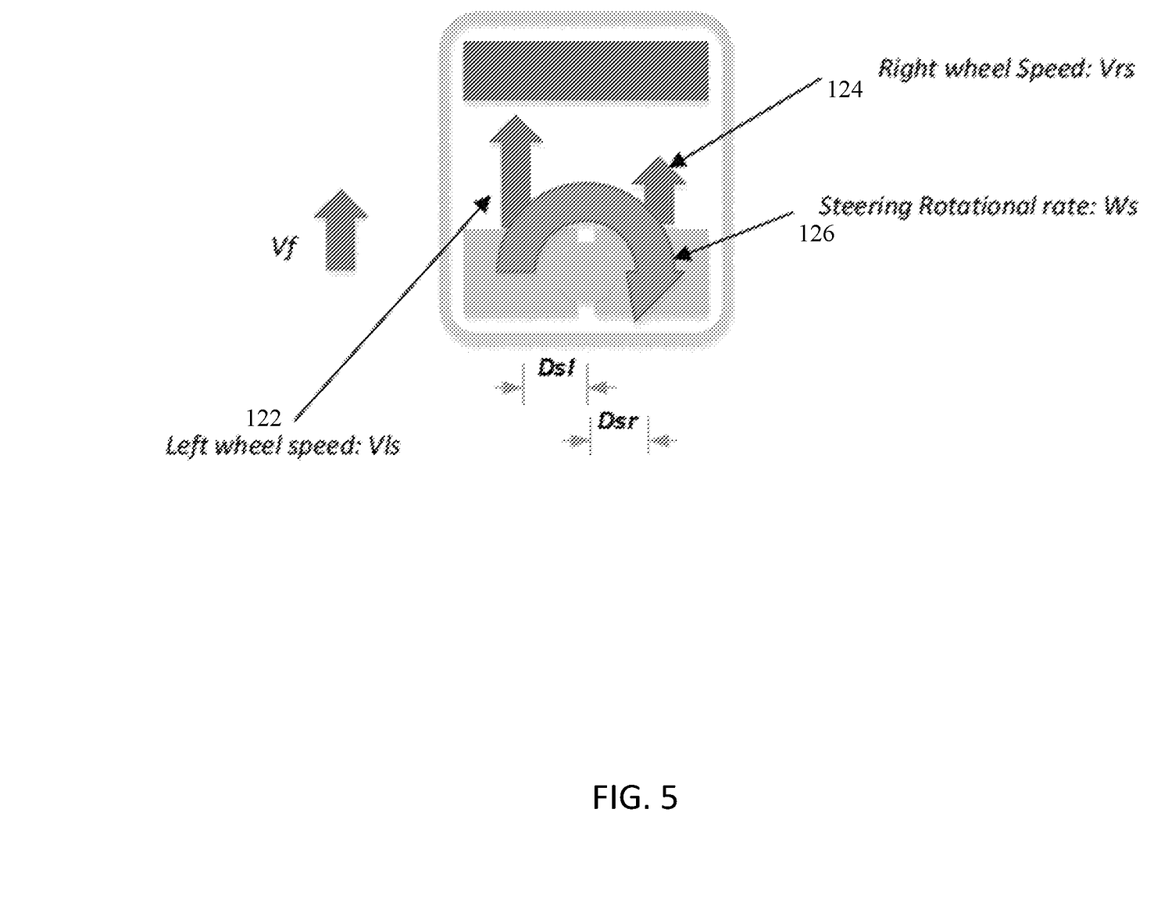
FIG. 5 is an illustration of an example system for differential traction drive with steering axis coordination in accordance with an aspect of the disclosure.

Referring to FIG. 5, the differential traction drives for each traction wheel are coordinated to assist the steering.

Figure 6:
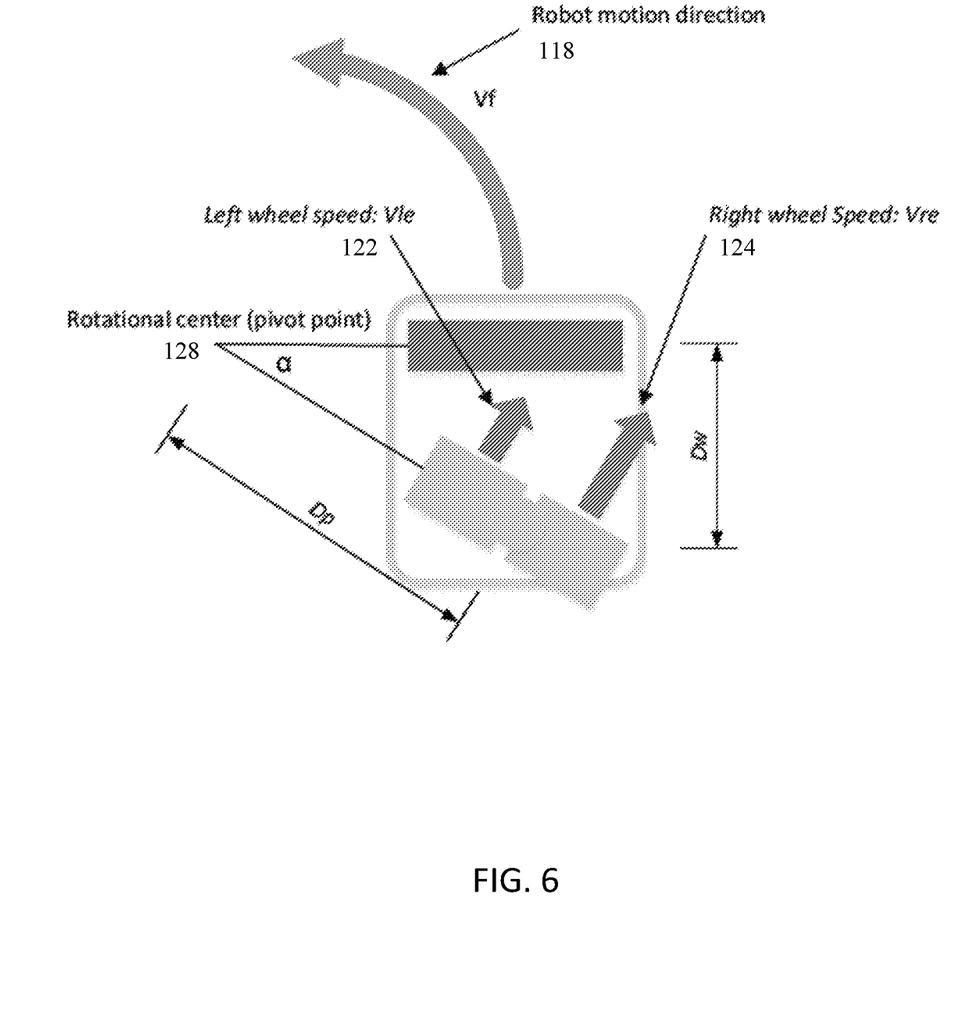
FIG. 6 is an illustration of an example system for differential traction drive with steering axis coordination in accordance with an aspect of the disclosure.

FIG. 6 is an illustration of the steering causing the turf device 100 to turn in a counter-clockwise direction.

Figure 7:
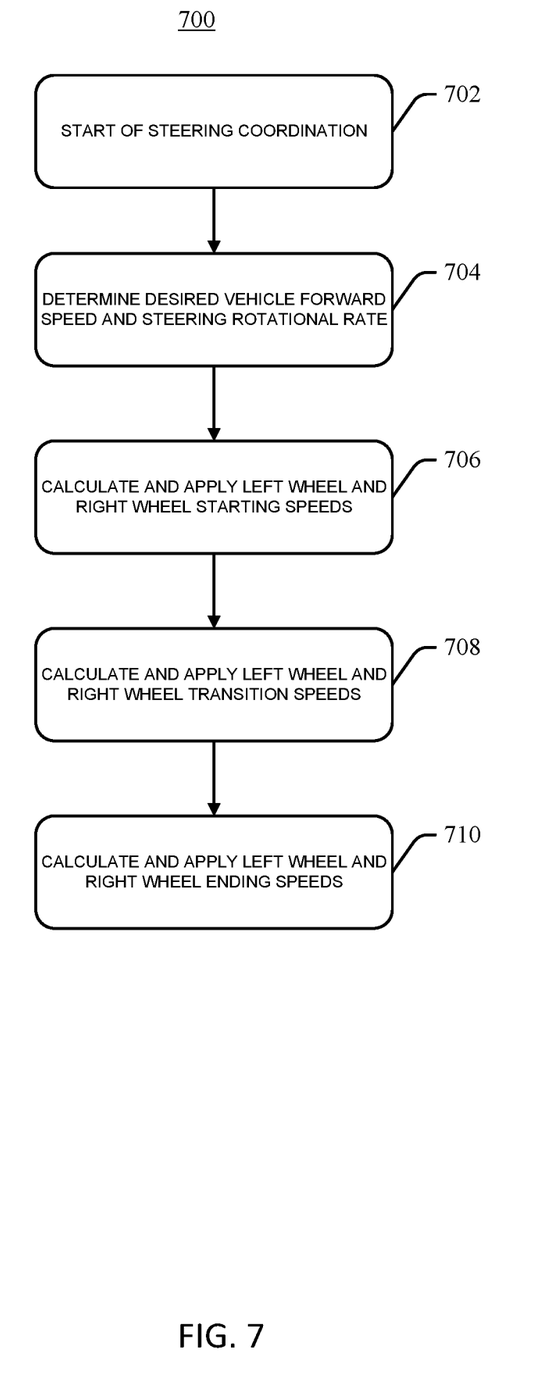
FIG. 7 is an example flow chart of operations for differential traction drive with steering axis coordination in accordance with an aspect of the disclosure.

Referring to FIG. 7, an example flow chart of operations for differential traction drive with steering axis coordination in accordance with an aspect of the disclosure is illustrated.

Figure 8:
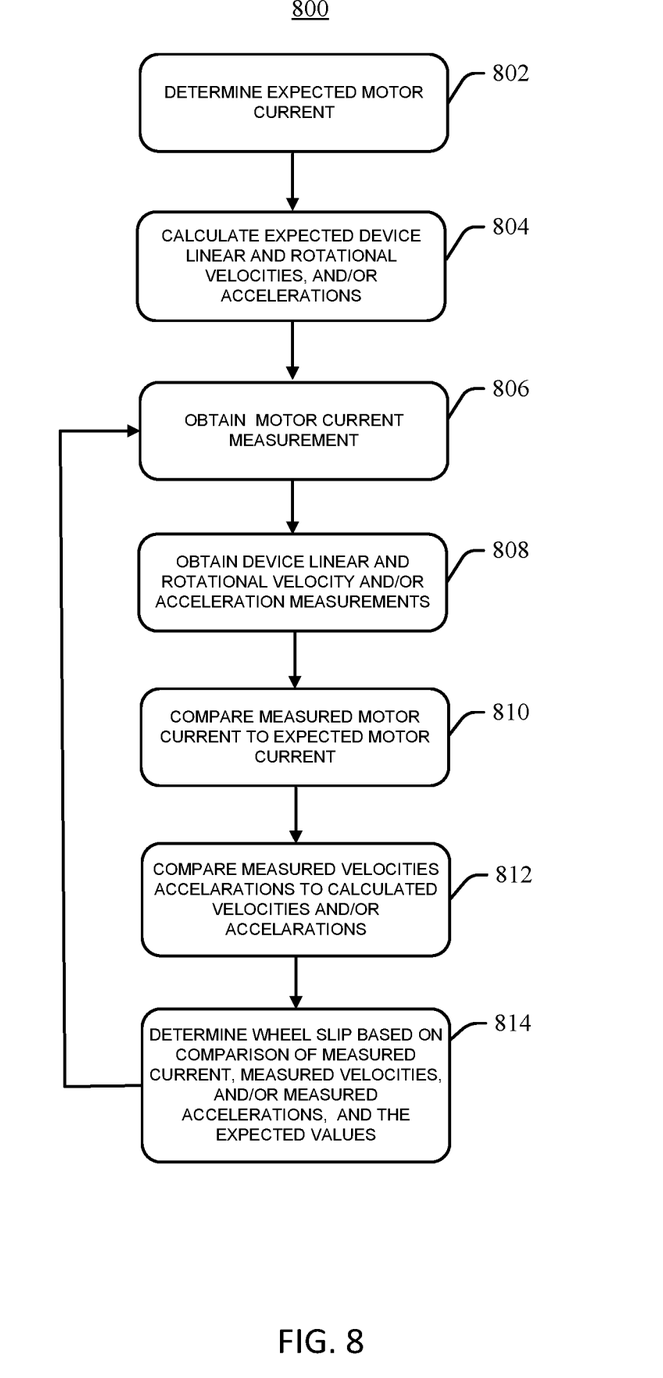
FIG. 8 is an example flow chart of operations for differential traction drive with steering axis coordination in accordance with an aspect of the disclosure.

FIG. 8 is an example flow chart of operations for differential traction drive with steering axis coordination in accordance with an aspect of the disclosure, including detection of traction issues.

Figure 9:
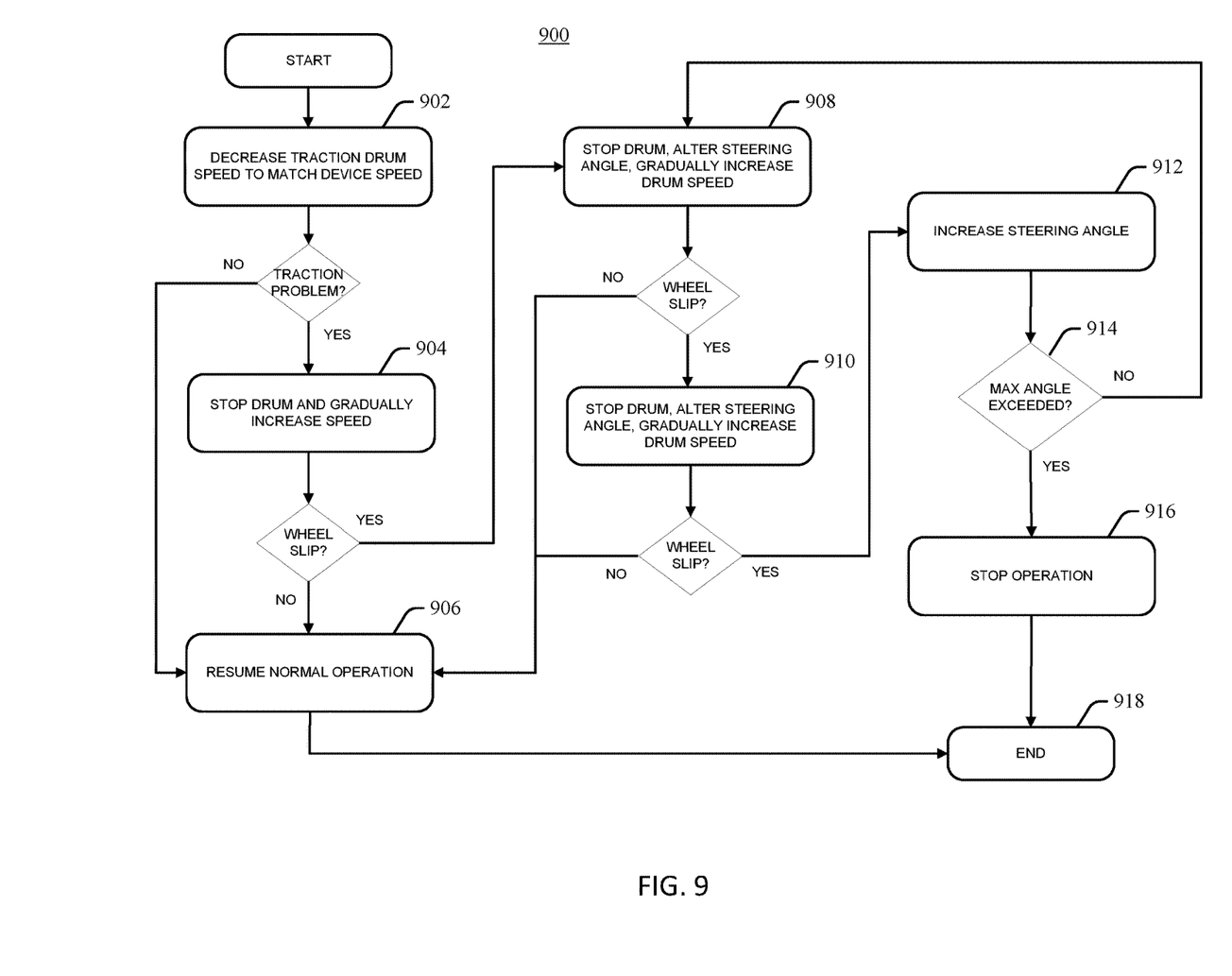
FIG. 9 is an example flow chart of operations for differential traction drive with steering axis coordination in accordance with an aspect of the disclosure.

FIG. 9 is an example flow chart of operations for differential traction drive with steering axis coordination in accordance with an aspect of the disclosure, including an example traction control scheme.

Referring to FIG. 3 and FIG. 4, during the turning motion, from the starting to the end, the desired speed of the right wheel will change in scale and also changes in the rotational direction. To smoothly change the wheel speeds, a coordination algorithm can be described as follows:

In an embodiment, at the start of the steering motion, to steer the turf device 100 to a desired angle $\alpha$, and when a is larger than a threshold angle $\beta$, can be derived, for example, as:

assuming the target overall turf device 100 forward speed is Vf (m/s);

the steering rotational speed is, Ws, which is driven by the steering motor 112 112 and with the traction wheels (rad./sec.); and the distance from the steering axle to the center of the left wheel, Dsl (m), which is the same to the right wheel, Dsr (m).

To match the steering rotational speed, the starting left wheel speed 122, Vls, and the right wheel starting speed 124, Vrs are obtained as:

$$Vls = Vf + Dsl * Ws$$

$$Vrs = Vf - Dsl * Ws$$

When applying Vls and Vrs, the steering assembly begins to turn. The overall coordination is shown in FIG. 5.

In an embodiment, at the ending of the steering motion, when reaching the desired steering angle, the ending speed of left wheel Vle, and the right wheel speed Vre can be determined by the following processes:

As shown in FIG. 6, the terms are calculated and defined as follows:

$$Dp = Dw/\sin(\alpha)$$

Where Dw is the distance between the front roller and the steering axle, α is the steering angle, and Dp is the distance from the pivot point to the steering axle. The distance between the front roller and the steering axle can measured from either of a center point, or a leading or trailing edge of the front roller and the steering axle, depending upon for example, the physical configuration of the front roller and the steering axle.

When the steering assembly turns counter-clockwise (α>0):

$$Vle = Vf*(Dp-Dsl)/Dp$$

$$Vre = Vf*(Dp+Dsr)/Dp$$

When the steering assembly turns clockwise and (α<0):

$$Vle = Vf*(Dp+Dsl)/Dp$$

$$Vre = Vf*(Dp-Dsr)/Dp$$

In an embodiment, the transition between starting and ending a steering motion is achieved as follows:

The transition wheel speeds can be applied in between the starting and ending steering motions when the differences angle, γ, between the current steering angle and the desired steering angle α is less than a pre-set threshold angle β.

$$Vlt = Vls + (Vle-Vls)*((\beta-\Gamma)/\beta)$$

$$Vrt = Vrs + (Vre-Vrs)*((\beta-\gamma)/\beta)$$

By applying the equations above, the wheel speeds gradually change from the start of the steering motion to the end of the motion, while maintaining the overall motion speed.

The disclosed system can include two traction motors, or a traction motor for each traction wheel, and a steering motor 112. In aspects, the disclosed system is overconstrained when compared to conventional systems including a single traction motor, and an open differential. This presents a challenge when optimizing the system, which is addressed by the algorithms disclosed herein, and which rely at least in part on the speed commanded to the motors, and in aspects, speed feedback from the motors. Additional variables can be considered, for example, the current draw of the motors, as well as additional knowledge associated with the dynamics of the system, the autonomous turf device 100, the operating environment, and/or the external terrain. For example, if the external terrain, or the ground surrounding the turf device, slopes in a particular direction, the traction wheels can be directed so that the force of gravity aids in the movement of the turf device 100.

In embodiments, sensors can be utilized to gather data concerning the operation and steering of the turf device 100. The additional sensors can be included in the body or structure of the turf device 100, can be remote to the turf device 100, or can be located within a work area, or remote to the work area. For example, data can be obtained from rotational encoders, tachometer, gyroscope, accelerometers, inertial measurement unit, odometer, velocity meter, global positioning system (GPS), Light Detection and Ranging (LIDAR), ultra-wideband radar, beaconing systems, Global System for Mobile Communications (GSM) localization, or most any other systems and sensors, and can be combined with data received via sensors included on the turf device 100.

A processing component includes hardware, software, and/or firmware components configured to receive, sample, filter, convert, process and use data, for example, data associated with the differential traction drive with steering axis coordination systems, and other sensors and inputs.

In an embodiment, processing component includes a microprocessor, data processing hardware and software, memory, and other associated hardware, software and algorithms for differential traction drive with steering axis coordination systems of the turf device 100. Processing component can perform operations associated with analog to digital signal conversion, signal sampling, signal filtering, execution of the disclosed algorithms, and other algorithms, evaluation of data, information determination, location determination, and most any other function related to differential traction drive with steering axis coordination.

The disclosed differential traction drive with steering axis coordination systems and methods can be implemented as "computer readable instructions", algorithms and/or modules for execution by the processing component. Computer readable instructions can be provided as program modules, such as functions, objects, Application Programming Interfaces (APIs), data structures, and the like, that perform particular tasks or implement particular abstract data types.

In further embodiments, the disclosed system and method can function in a mode in the event the turf device 100 becomes stuck, or starts slipping. The combined system can be re-optimized with the goal of maximizing tractive force whereby it temporarily foregoes the goal of achieving a particular traction speed and focuses on regaining traction. For example, the steering is set straight and the turf device 100 smoothly accelerates both traction motors, so they match speed. Other embodiments can utilize a kinematic model of the system including weight distribution as well as a model for the terrain to maximize the tractive force applied by the turf device 100 to the ground.

In an embodiment, when the external terrain, or the ground surrounding the turf device, slopes in a particular direction, the traction wheels can be directed so that the force of gravity aids in the movement of the turf device 100. Likewise, data associated with the weight distribution of the turf device 100 can be used in determining a steering angle.

In an embodiment, a computer implemented method for traction control for a turf device 100 having at least one traction wheel for providing motion on a ground surface includes detecting a wheel slip event, and responsive to the wheel slip event, stopping motion of the wheel and then gradually increasing a wheel speed, detecting a wheel slip event, stopping motion of the wheel, determining if a steering angle of the wheel is less than or equal to a predetermined maximum steering angle and adjusting a steering angle of the wheel, and gradually increasing the wheel speed while the steering angle is less than or equal to a predetermined maximum steering angle.

Adjusting a steering angle of the wheel can include adjusting the steering angle to a first defined value. The steering angle can be adjusted to a second defined value that is opposite to the first defined value subsequent to adjusting the steering angle to the first defined value, and then gradually increasing wheel speed and detecting a wheel slip event. The number of defined values (first, second, third, . . . values) can be subject to the applications. A greater number of defined values causes the turf device 100 to make successive attempts to regain traction. The first defined angle can be increased in successive iterations, and the second defined angle can be opposite to the first defined angle.

In an embodiment, a computer implemented method for detecting wheel slip for a turf device 100 having at least one wheel 106, 108 for providing motion over a ground surface includes measuring a motor current associated with the turf device 100, calculating an expected turf device 100 motor current, determining a wheel slip condition based on a comparison of the measured motor current to the calculated device motor current.

In further embodiments, a computer implemented method for detecting wheel slip for a turf device 100 having at least one wheel 106, 108 for providing motion over a ground surface includes measuring a linear velocity and accelerations associated with the turf device 100, measuring a rotational velocity associated with the turf device 100, calculating an expected linear velocity and acceleration associated with the turf device 100, calculating an expected rotational velocity and acceleration associated with the turf device 100, determining a wheel slip condition based on a comparison of the measured linear velocity and accelerations associated with the turf device 100 to the calculated linear velocity and accelerations associated with the turf device 100, and determining a wheel slip condition based on a comparison of the measured rotational velocity associated with the turf device 100 to the calculated rotational velocity associated with the turf device 100.

FIG. 7 illustrates a method 700 for differential traction drive with steering axis coordination in accordance with aspects of the disclosure. The method 700 begins at act 702 where the steering axis coordination method begins. At act 704, the method can include initiating a steering motion based on a target turf vehicle forward speed, and a steering rotational speed. The steering rotational speed (or angular velocity) 124 can be driven by a steering motor 112 and the traction wheel (e.g., rad./sec.) associated with the turf vehicle. Example calculations for use in connection the method 700 are described in detail supra.

At act 706, a left wheel starting speed V/s and a right wheel starting speed Vlr can be determined and applied. The starting wheel speeds can be determined based on, for example, the target forward speed, a distance from a steering axle to the center of the respective wheel, and the steering rotational speed.

At act 708, the turf vehicle is a left wheel transition speed Vlt and a right wheel transition speed Vlt can be determined and applied, based on for example, the respective starting and ending wheel speeds, and the differences between the current steering angle and the desired steering angle. In an embodiment, the left and right wheel transition speeds are calculated and applied when the difference between the current steering angle and the desired steering angle is less than a predetermined threshold angle.

At act 710, the turf vehicle is a left wheel ending speed Vle and a right wheel ending speed Vle can be determined and applied, based on for example, the desired turf device speed, a distance from the steering axle to the center of the respective wheel, and a distance from the pivot point to the steering axle. The pivot point can be calculated based on the distance from the front roller to the steering axle, and the desired steering angle.

The application of the starting wheel speeds, the transition wheel speeds, and the ending wheel speeds as detailed above provide a coordinated steering motion wherein the left and right wheel speeds gradually change from the start of the steering motion to the end of the motion, while maintaining the overall motion speed of the turf device 100.

FIG. 8 illustrates a method 800 for differential traction drive with steering axis coordination in accordance with aspects of the disclosure. In an embodiment, the disclosed method solves problems associated with traction issues, such as wheel slippage and wheel spinning. Significant damage to the turf can be caused by spinning/slipping of the traction wheels or drums on the turf. The disclosed method of traction control lessens or prevents spinning/slipping of the traction wheels thus lessening or preventing damage to the turf. Further, two independent traction motors allow the turf device 100 to control the individual traction motors to re-gain traction and minimize turf wear when one of the traction wheels is slipping.

The method 800 can be utilized to identify a traction issue by detecting, for example, wheel slip. Wheel slippage can be detected by determining an amount of electrical current applied to the motors. When a traction wheel is slipping/spinning on the turf, the current drawn by the motor will be less than expected. In an embodiment, traction wheel slipping/spinning can also be detected by determining the motion of the turf device 100 with respect to the steering angle and traction drum speed. In further embodiments, traction wheel slipping and/or spinning can be detected utilizing a measurement of the turf device's linear velocity and rotational velocity and a kinematics model of the turf device 100, and/or a measurement of the turf device's linear acceleration and rotational acceleration and a dynamics model of the turf device 100. For example, a kinematics model of the turf device 100 is utilized to estimate the turf device's linear velocity and rotational velocity with the commanded drum steering angle and drum speed, and a dynamics model of the turf device 100 is utilized to estimate the turf device's linear acceleration and rotational acceleration with the commanded traction drum steering angle and traction drum speed.

The present motion of the turf device 100 in linear velocity, rotational velocity and accelerations can be measured using sensors such as GPS, IMU LiDAR and/or AHRS, and the like. An estimated turf device 100 response and the measured result are compared to determine if the turf device 100 is experiencing slipping or spinning of the traction wheel or wheels. With reference to FIG. 8, the method 800 begins at step 802 where the expected motor current draw is calculated utilizing, for example, a motor and load model. At step 804, expected turf device 100 velocities and accelerations are determined utilizing an inverse kinematics model, an inverse dynamics model and/or information on the motion commands provided to the turf device 100, for example, the traction drum steering angle and traction drum speed commanded or controlled by the turf device 100.

At act 806, a measurement of the motor current is obtained. The measured motor current is compared to the expected motor current at step 810.

Still referring to FIG. 8, at step 808 the linear and rotational velocities and/or the linear and rotational accelerations of the turf device 100 are measured. The estimated linear and rotational velocities and/or the estimated linear and rotational accelerations of the turf device 100 are compared with the measured linear and rotational velocities and/or measured estimated linear and rotational accelerations of the turf device 100 at step 812. At step 814, spinning or slip of the traction wheel is determined based on the comparisons of the measured current draw, linear and rotational velocities, and/or linear and rotational accelerations to the expected or calculated current draw, linear and rotational velocities, and/or linear and rotational accelerations.

In aspects, the measurements and comparisons performed at steps 806, 808, 810, and 812 are completed multiple times in an iterative manner, and the results can be averaged or weighted value at step 814. The comparison at step 814 can be conducted utilizing the weighted or averaged motor current measurements, and/or weighted or averaged linear and rotational velocity measurements, and linear and rotational acceleration measurements obtained at steps 806 and 808.

In an embodiment, traction wheel slip is indicated when the measured motor current differs from an expected motor current by a predetermined threshold. In aspects, traction wheel slip is indicated when the measured turf device 100 velocities and accelerations differ from the estimated linear and/or rotational velocities and the estimated linear and/or rotational accelerations of the turf device 100 by a predetermined threshold. In other embodiments, a combination of the data from the comparison of the measured motor current to an expected motor current and data from a comparison of the measured turf device 100 velocities and accelerations to the estimated or calculated velocities and accelerations of the turf device 100 is used to determine traction wheel slip.

FIG. 9 illustrates an example traction control method 900. When traction wheel slippage has been detected, for example utilizing method 800, the turf device 100 can perform a traction control method to re-gain wheel traction. With reference to FIG. 9, a traction control method 900 can include step 902 where a speed command that slows down the wheel speed, or a brake command is applied to the traction wheel that has been determined to be slipping. By matching the turf device's measured rotational wheel speeds and the motor current, the turf device 100 can gain increased traction in each individual traction drum.

If no traction issues are detected, for example utilizing method 800, the turf device 100 resumes normal operation at step 906. If the turf device 100 remains stuck, i.e. one or more wheels are indicated as slipping, the drum can be stopped, and then the drum speed gradually increased to exploit greater traction, for example in the form of static fraction, at step 904. As in step 902, if no traction issue is detected, the turf device 100 resumes normal operation at step 906, and the method 900 ends at step 918.

If the turf device 100 continues to remain stuck, the turf device 100 can perform one or more maneuvers to break free. At step 908, the wheel is stopped and then turned or steered in a defined angle based on, for example, a measured incline. Motion of the wheel is then gradually re-started. If no traction issue is detected subsequent to the maneuver of step 908, the turf device 100 resumes normal operation at step 906, and the method 900 ends at step 918.

If the turf device 100 continues to remain stuck, the turf device 100 can perform the maneuver of step 910 where the wheel drum is stopped, and then steered in an angle opposite to, or different from, the defined angle in step 908. The wheel is then engaged and driven at a relatively low speed to exploit static fraction present between the wheel and the ground, or obstacle. For example, if wheel slip is indicated after step 908 at a steering angle of 30 degrees, then the wheel can be turned to −30 degrees at step 910, and the wheel speed gradually increased to avoid slippage. If no traction issue is detected subsequent to the maneuver of step 910, the turf device 100 resumes normal operation at step 906, and the method 900 ends at step 918.

While the turf device 100 remains stuck, the turf device 100 can perform the maneuver of step 912 where each wheel drum is stopped and then steered in an angle different from its present steering angle, and then the wheel speed gradually increased. In an embodiment, the steering angle of step 912 is increased when compared to the steering angle of step 910.

For example, if the wheel remains stuck at −30 degrees, the wheel is turned to 45 degrees, and then −45 degrees, and so on. The wheel is engaged at each successive angle, and the wheel speed is gradually increased to avoid slippage. If no traction issues are detected subsequent to the maneuvers of step 912, the turf device 100 resumes normal operation at step 906, and the method 900 ends at step 918.

The maneuvers of steps 908, 910 and 912 can be repeated at increasing steering angles until a predetermined maximum steering angle has been detected as met or exceeded at step 914, and at which point operation of the turf device 100 is halted 916 and the method 900 ends at step 918.

While, for purposes of simplicity of explanation, the methodology illustrated in FIGS. 7-9 is shown and described as a series of acts or steps, it is to be understood and appreciated that the subject disclosure is not limited by the order of acts or steps, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts or steps may be required to implement a methodology in accordance with the disclosure.

While embodiments of the disclosed differential traction drive with steering axis coordination systems and methods have been described, it should be understood that the differential traction drive with steering axis coordination systems and methods are not so limited and modifications may be made without departing from the disclosed differential traction drive with steering axis coordination systems and methods. The scope of the differential traction drive with steering axis coordination systems and methods are defined by the appended claims, and all turf devices, processes, and methods that come within the meaning of the claims, either literally or by equivalence, are intended to be embraced therein.

The invention claimed is:

1. A method for traction control for a device having at least one wheel for providing motion on a surface, comprising:
   detecting a first wheel slip event of a first wheel having a wheel speed;
   responding to the first wheel slip event by stopping the first wheel, gradually increasing the wheel speed of the first wheel;
   detecting a second wheel slip event of the first wheel; and
   responding to the second wheel slip event by, stopping the first wheel, determining if a steering angle α of the first wheel is less than or equal to a maximum steering angle, adjusting the steering angle α of the first wheel to some first defined angle less than or equal to the maximum steering angle, and
   gradually increasing the wheel speed of the first wheel while the steering angle is the first defined angle.

2. The method of claim 1, wherein the device is a turf device.

3. The method of claim 1, wherein the surface is a ground surface.

4. The method of claim 1, wherein the maximum steering angle is a predetermined maximum steering angle.

5. The method of claim 4, wherein each operation of gradually increasing the wheel speed of the first wheel is an operation that maintains traction in the form of static friction between the first wheel and the surface.

6. The method of claim 5, further comprising, subsequent to adjusting the steering angle α to a first defined angle, adjusting the steering angle α to a second defined angle opposite to the first defined angle.

7. The method of claim 6, further comprising, subsequent to adjusting the steering angle α to the second defined angle, gradually increasing the wheel speed of the first wheel.

8. The method of claim 7, further comprising, subsequent to adjusting the steering angle α to a second defined angle and gradually increasing the wheel speed of the first wheel, adjusting the steering angle α to a third defined angle greater than the first defined angle and less than the maximum steering angle.

9. The method of claim 8, further comprising, subsequent to adjusting the steering angle α to the third defined angle, gradually increasing the wheel speed of the first wheel.

10. A computer implemented method for traction control for a turf device having at least one wheel for providing motion on a ground surface, comprising:
    detecting a wheel slip event;
    responsive to the wheel slip event, stopping motion of the wheel and then gradually increasing a wheel speed;
    detecting another wheel slip event;
    stopping motion of the wheel;
    determining that a steering angle of the wheel is less than or equal to a predetermined maximum steering angle and
    i) adjusting the steering angle of the wheel; and
    ii) gradually increasing the wheel speed while the steering angle is less than or equal to a predetermined maximum steering angle.

11. The computer implemented method for traction control of claim 10, wherein adjusting a steering angle of the wheel comprises adjusting the steering angle to a first defined value.

12. The computer implemented method for traction control of claim 11, comprising:
    subsequent to adjusting the steering angle to a first defined value, adjusting the steering angle to a second defined value opposite to the first defined value; and
    gradually increasing the wheel speed.

13. The computer implemented method for traction control of claim 12, wherein the first defined angle is increased in successive iterations, and wherein the second defined angle is opposite to the first defined angle.

14. The computer implemented method for traction control of claim 10, comprising stopping operation of the turf device when the steering angle exceeds a predetermined maximum steering angle.

15. The computer implemented method for traction control of claim 10, wherein the steering angle is determined based on data associated with the weight distribution of the turf device.

* * * * *